July 22, 1924.
F. J. MAY
1,502,639
AUTOMOBILE SIGNAL
Filed Aug. 31, 1922
2 Sheets-Sheet 1
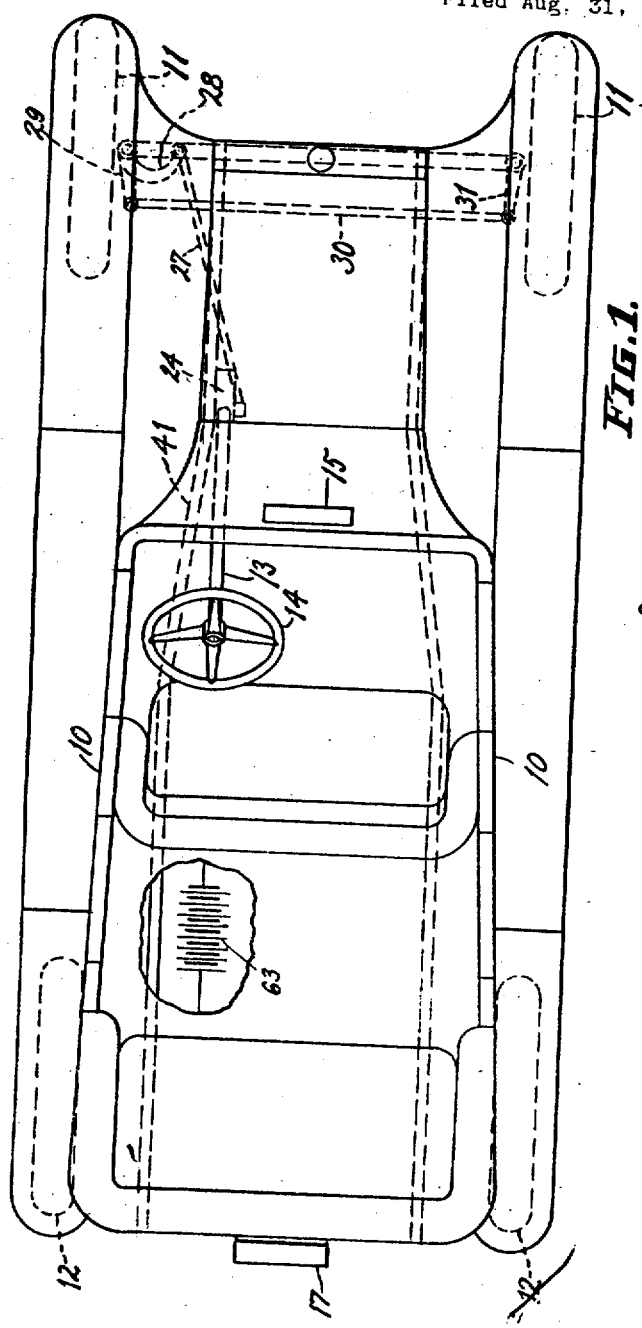
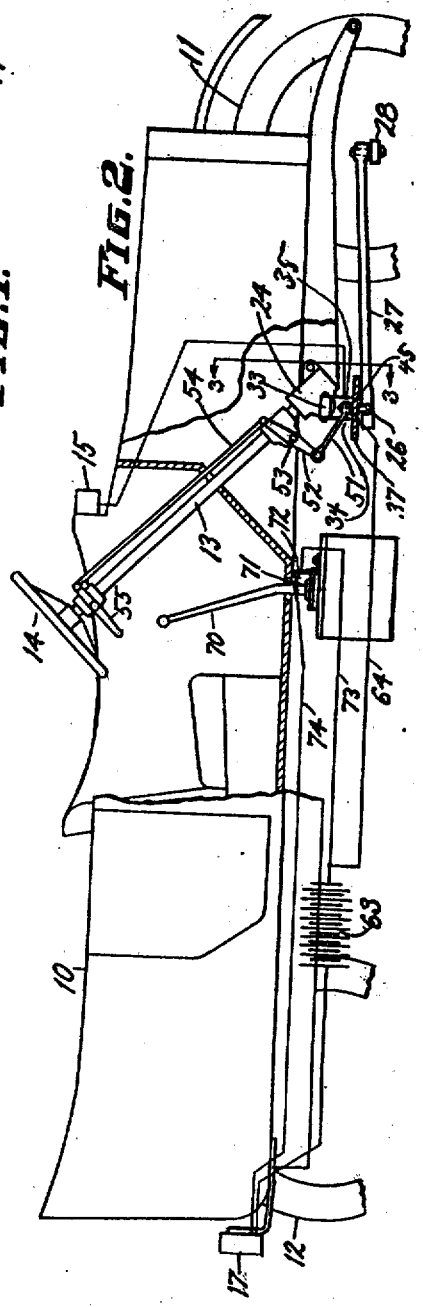
INVENTOR:
Frank J. May
BY N. M. Carlsen,
ATTORNEY July 22, 1924.
F. J. MAY
1,502,639
AUTOMOBILE SIGNAL
Filed Aug. 31, 1922    2 Sheets-Sheet 2
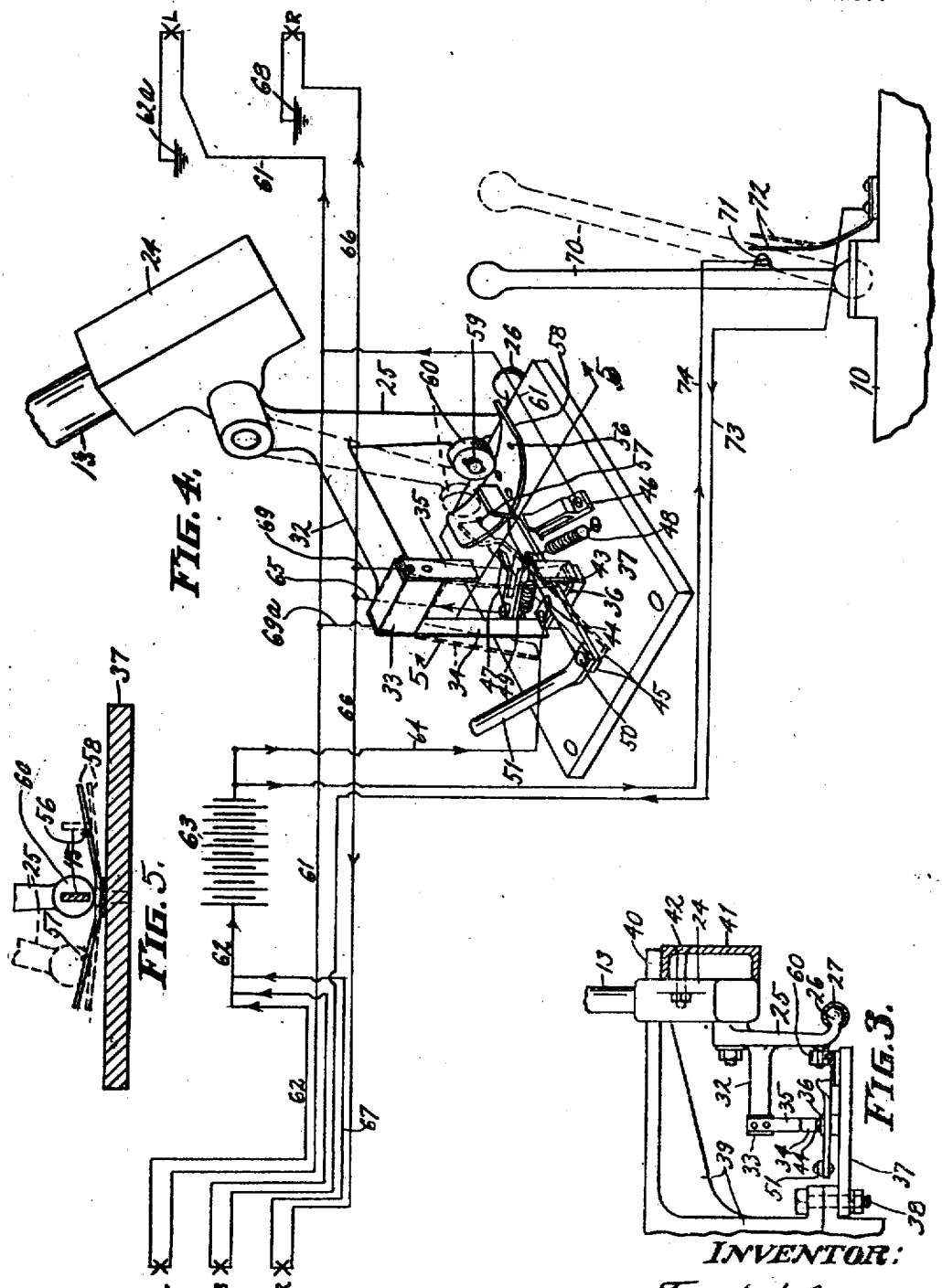
INVENTOR:
Frank J. May
BY  A. M. Carlson
ATTORNEY Patented July 22, 1924.

1,502,639

UNITED STATES PATENT OFFICE.

FRANK J. MAY, OF ST. PAUL, MINNESOTA, ASSIGNOR OF ONE-FOURTH TO ERVIE W. OLSON, OF ST. PAUL, MINNESOTA.

AUTOMOBILE SIGNAL.

Application filed August 31, 1922. Serial No. 585,338.

*To all whom it may concern:*

Be it known that I, FRANK J. MAY, a citizen of the United States, residing at St. Paul, in the county of Ramsey and State of Minnesota, have invented certain new and useful Improvements in Automobile Signals, of which the following is a specification.

My invention relates to automobile signal devices for indicating when the vehicle is about to turn to the right or left. The object is to improve and also to combine means for said purposes.

In the accompanying drawings:

Fig. 1 is a top view of an automobile equipped with my invention.

Fig. 2 is a partly sectional side elevation of Fig. 1.

Fig. 3 is an enlarged section on line 3—3 of Fig. 2.

Fig. 4 is a perspective view of the main mechanism of the device and a diagrammatic view of the electric circuit of the device.

Fig. 5 is a section on line 5—5 of Fig. 4.

Referring to the drawing by reference numerals, 10 designates the body of an automobile or other auto vehicle having front supporting wheels 11, rear wheels 12, a steering column 13 and steering wheel 14.

In Figs. 2, 3 and 4 it will be understood that 24 is the usual housing for the gears (not shown) connecting the steering shaft 13 with the rocker arm 25, whose swinging end 26 connects with a link 27, which operates a rocker arm of the skein in one of the front wheels 11, said arm 28 having a branch 29 connected by a link 30 to the rocker arm 31 of the skein of the other front wheel 11.

On the regular arm 25 I secure an arm 32, on the free end of which is fixed a block 33. Secured to said block or otherwise to arm 32 are two depending resilient electro-conductive fingers 34—35, the latter partly broken away in Figs. 3 and 4 so as to better disclose a switch block 36 the ends of which said fingers are to contact with alternately as the steering post 13 is turned.

Block 36 is fixed upon a small platform 37 secured at 38 or otherwise to the engine frame 39, the latter having an arm 40 supported on part 41 of the car frame to which gear housing 24 is secured by a bolt 42. 43 is insulation holding switch block 36 spaced above the platform, and to said block 36 is fulcrumed at 44 a switch lever 45 adapted to be swung alternately into knife switch jaws 46—47, two contracting coil springs 48—49 serving to hold the lever normally about midway between said switch jaws.

One end of the lever 45 is pivoted at 50 to a rod 51 (see Figs. 2, 3 and 4) having its upper end operated by a beam lever 52, fulcrumed at 53 and having its other arm connected to a rod 54 operated vertically by a finger lever 55 mounted near the steering wheel. The other end of switch lever 45 is twisted with one edge downward so as to readily engage either one of two catches 56, 57 fixed one near each end of an arched leaf-spring 58, secured at its middle to the platform.

Mounted on a stud 59 fixed in the arm 25 is an anti-friction roller 60, which when the arm 25 swings, moves from end to end of the leaf spring upon its face but beyond the end of the switch lever and will alternately spring down either end of the spring sufficiently to cause the catch 56 or 57 to disengage the switch lever and let it return to normal position. To this movement the finger lever 55 offers no resistance as that will be idle except when operated by the driver's hand for the purpose presently to be stated.

In Fig. 4 it will be seen that the switch jaw 46 is connected by the wire 61 to the front and rear left side lights L, the current returning to battery 63 partly directly over wire 62 and partly indirectly through grounding 62ª, and the current from the battery reaches the switch jaw 46 through wire 64, switch block 36 and lever 45 whenever the latter is swung into contact with jaws 46. In like manner the lever 45, when swung by rod 51, contacts with jaws 47, the current running from the latter jaw to the front and rear lights R of the right hand side of the car, over wires 65, 66 and returns to the battery partly over wire 67 and partly through the grounding 68. This explains the showing of right and left signaling by raising or lowering the finger lever 55 in Fig. 2, said lever being merely thrown up or down the moment it is desired to turn the car to either the right or left side, the lever is at once released; for its motion has caused the switch lever 45 to engage and be held by one of the catches 56, 57, where it is held until the car has been steered into the new direction when the roller 60 presses down the spring arm 58 and releases the catch from the lever.

If the operator should forget to operate the finger lever 55 or does not care to operate it for only a partial turning of the car, the right or left lights will be switched on automatically by the contact of either one of the resilient fingers 34—35 with the switch block 36, because said resilient fingers are connected by 69, 69* to the wires 66 and 61 respectively. The resiliency of the fingers 34—35 is to allow the steering hand wheel to turn and do most of the steering after the lights are turned on. This auxiliary switching device while automatic and affording some safety does not give the signal desirably ahead of time of actual side steering. The latter advantage is however secured by the finger lever which may be operated at any time regardless of the fingers 34, 35, so that the two devices combine to make a perfect signalling mechanism.

In Fig. 4 is shown that the reversing lever 70, when in position to cause reversing, brings an electric switch member 71 in contact with resilient switch member 72, whereby circuit is closed over wires 73—74 with the battery and the light B in Fig. 4 so as to signal a backward movement of the car.

What I claim is:

1. In a direction signal for auto vehicles, an electric switch comprising, a base, an insulated block fixed on the base, a switch-lever fulcrumed on the block to swing in plane with the base, operative connection between one arm of said lever, a finger operated lever mounted near the steering wheel; the other or second arm of the lever having springs holding it normally idle between the terminal points of its swinging movement, two switch members fixed on the base in normally spaced relation to the second arm, one at each side thereof; a leaf spring secured at its middle to the base below said second arm and being curved segmentally with its ends upward from the base and being each provided with a catch arranged to engage the arm of the lever and hold it in contact with either one of the fixed switch members, a roller arranged to move back and forth above the leaf spring and adapted to depress either end of the spring so as to disengage the catches from the switch lever when it is to be returned to normal position, and a swinging arm carrying said roller and having operative connection with the steering shaft of the vehicle.

2. The structure specified in claim 1, in which the said roller-carrying arm has a branch, two resilient switch fingers carried by the branch and arranged to contact alternately one with each of two opposite sides of the insulated block holding the switch lever, all suitably connected in an electric circuit, for the purposes set forth.

In testimony whereof I affix my signature.

FRANK J. MAY.